US012747344B2

(12) United States Patent
Hsieh et al.

(10) Patent No.: US 12,747,344 B2
(45) Date of Patent: Sep. 29, 2026

(54) RESIN COMPOSITION AND CURED FILM

(71) Applicant: Advanced Echem Materials Company Limited, Taoyuan (TW)

(72) Inventors: Yi-Fang Hsieh, Taoyuan (TW); Yu-Ning Chen, Taoyuan (TW); Shao-Li Ho, Taoyuan (TW); Hui-Ju Chen, Taoyuan (TW)

(73) Assignee: Advanced Echem Materials Company Limited, Taoyuan (TW)

( * ) Notice: Subject to any disclaimer, the term of this patent is extended or adjusted under 35 U.S.C. 154(b) by 637 days.

(21) Appl. No.: 18/347,592

(22) Filed: Jul. 6, 2023

(65) Prior Publication Data

US 2024/0010827 A1 Jan. 11, 2024

(30) Foreign Application Priority Data

Jul. 8, 2022 (TW) ................................. 111125715

(51) Int. Cl.

*C08L 29/02* (2006.01)
*C08K 5/06* (2006.01)
*C08K 5/136* (2006.01)
*C08K 5/42* (2006.01)

(52) U.S. Cl.

CPC ................ *C08L 29/02* (2013.01); *C08K 5/06* (2013.01); *C08K 5/136* (2013.01); *C08K 5/42* (2013.01); *C08L 2203/16* (2013.01); *C08L 2205/03* (2013.01)

(58) Field of Classification Search

CPC ...................................................... C08L 29/02
See application file for complete search history.

(56) References Cited

U.S. PATENT DOCUMENTS

2019/0264035 A1 8/2019 Aoki et al.
2020/0249572 A1* 8/2020 Furue ...................... G03F 7/033
2024/0172550 A1* 5/2024 Yamaguchi .......... H10K 85/151

FOREIGN PATENT DOCUMENTS

| | | |
|---|---|---|
| CN | 106432711 | 2/2017 |
| CN | 109564388 | 4/2019 |
| CN | 109844639 | 6/2019 |
| CN | 110850684 | 2/2020 |
| CN | 110862497 | 3/2020 |
| CN | 111240153 | 6/2020 |
| CN | 111352300 | 6/2020 |
| CN | 116426170 | 7/2023 |
| TW | 1525062 | 3/2016 |
| TW | 201841060 | 11/2018 |
| WO | 2018047417 | 3/2018 |
| WO | 2020203387 | 10/2020 |
| WO | 2022092281 | 5/2022 |

OTHER PUBLICATIONS

"Office Action of Taiwan Counterpart Application", issued on Mar. 31, 2023, p. 1-p. 10.
"Office Action of China Counterpart Application", issued on May 7, 2025, p. 1-p. 6.
"Office Action of China counterpart Application", issued on Dec. 24, 2025, p. 1-p. 10.

* cited by examiner

*Primary Examiner* — Michael F Pepitone
(74) *Attorney, Agent, or Firm* — JCIPRNET

(57) ABSTRACT

A resin composition and a cured film are provided. The resin composition includes a resin (A), a crosslinking agent (B), a surfactant (C), an additive (D) and a solvent (E). The resin (A) includes at least one of a phenol-based resin (A-1) and a polystyrene resin including a hydroxyl group (A-2). The additive (D) includes a fluoro-based phenol (D-1), a polyhydroxyphenol resin (D-2), a compound including an epoxy group (D-3), a polyether resin (D-4), a thermal acid generator including a sulfonate ion (D-5), or a combination thereof.

15 Claims, No Drawings

RESIN COMPOSITION AND CURED FILM

CROSS-REFERENCE TO RELATED APPLICATION

This application claims the priority benefit of Taiwan application serial no. 111125715, filed on Jul. 8, 2022. The entirety of the above-mentioned patent application is hereby incorporated by reference herein and made a part of this specification.

BACKGROUND

Technical Field

The invention relates to a resin composition, particularly to a resin composition and a cured film.

Description of Related Art

Demands for miniaturization of devices increase as these technologies are going through a vigorous development. The consequent demand is that the components and designs within the devices are required to be correspondingly reduced. For this reason, the patterns within the element are required to have narrower line widths. However, when the line width of the pattern becomes narrower, the phenomenon of pattern collapse during the manufacturing process occurs, thereby affecting the performance of the fabricated device/element.

SUMMARY

The invention provides a resin composition and a cured film capable of providing good coating uniformity, chemical resistance and hydrophobicity.

A resin composition of the invention includes a resin (A), a crosslinking agent (B), a surfactant (C), an additive (D) and a solvent (E). The resin (A) includes at least one of a phenol-based resin (A-1) and a polystyrene resin including a hydroxyl group (A-2). The additive (D) includes a fluoro-based phenol (D-1), a polyhydroxyphenol resin (D-2), a compound including an epoxy group (D-3), a polyether resin (D-4), a thermal acid generator including a sulfonate ion (D-5), or a combination thereof.

In an embodiment of the invention, a weight average molecular weight of the resin (A) is 400 to 30,000.

In an embodiment of the invention, the phenol-based resin (A-1) includes a structural unit represented by Formula (A1) as follows. A weight average molecular weight of the phenol-based resin (A-1) is 360 to 39,200.

Formula (A1)

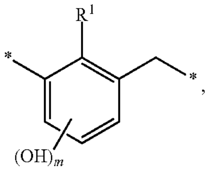

in Formula (A1), $R^1$ represents hydrogen or an alkyl group having 1 to 4 carbon atoms, m represents an integer from 1 to 3, and * represents a bonding position.

In an embodiment of the invention, the polystyrene resin including a hydroxyl group (A-2) includes a structural unit represented by Formula (A2) as follows. A weight average molecular weight of the polystyrene resin including a hydroxyl group (A-2) is 12,400 to 19,300.

Formula (A2)

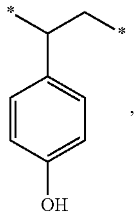

in Formula (A2), * represents a bonding position.

In an embodiment of the invention, the crosslinking agent (B) includes a phenolic epoxy resin-based crosslinking agent, a polymethyl methacrylate-based crosslinking agent, a maleic anhydride-based crosslinking agent, or a combination thereof.

In an embodiment of the invention, the surfactant (C) includes a fluorine-based surfactant. The fluorine-based surfactant includes a hydroxyl group, an ester group, a carboxyl group, an ether group, or a combination thereof.

In an embodiment of the invention, the fluoro-based phenol (D-1) includes a compound represented by Formula (D1) as follows. A weight average molecular weight of the fluoro-based phenol (D-1) is 112 to 600.

Formula (D1)

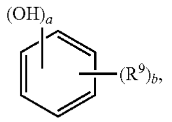

in Formula (D1), $R^9$ represents fluorine or a fluoroalkyl group having less than 4 carbon atoms, a represents an integer greater than 0, b represents an integer greater than 0, and a sum of a and b is greater than or equal to 2 and less than or equal to 6.

In an embodiment of the invention, the polyhydroxyphenol resin (D-2) includes a structural unit represented by Formula (D2) as follows. A weight average molecular weight of the polyhydroxyphenol resin (D-2) is 12,500 to 30,000.

Formula (D2)

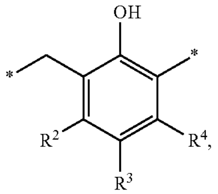

in Formula (D2), $R^2$ to $R^4$ each represent hydrogen or an alkyl group having 1 to 4 carbon atoms, and * represents a bonding position.

In an embodiment of the invention, the polyhydroxyphenol resin (D-2) includes a structural unit represented by Formula (D3) as follows and a structural unit represented by Formula (D4) as follows. A ratio of the structural unit represented by Formula (D3) to the structural unit represented by Formula (D4) is 70:30 to 90:10.

Formula (D3)

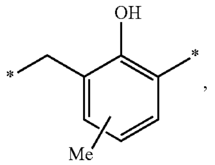

Formula (D4)

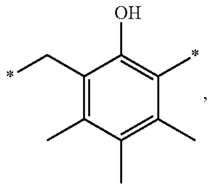

in Formula (D3) and Formula (D4), * represents a bonding position.

In an embodiment of the invention, the compound including an epoxy group (D-3) includes an epoxy group, and further includes a long carbon chain, an ether group, or combinations thereof.

In an embodiment of the invention, the polyether resin (D-4) includes a structural unit represented by Formula (D5) as follows. A weight average molecular weight of the polyether resin (D-4) is 2,000 to 10,000.

Formula (D5)

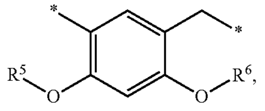

in Formula (D5), $R^5$ and $R^6$ each represent

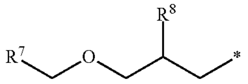

or hydrogen, and at least one of $R^5$ and $R^6$ represent

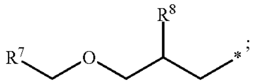

$R^7$ and $R^8$ each represent a hydroxyl group, an ether group, an alkyl group, a fluorine, or a combination thereof, and * represents a bonding position.

In an embodiment of the invention, the thermal acid generator including a sulfonate ion (D-5) includes fluorine.

In an embodiment of the invention, the solvent (E) includes propylene glycol monomethyl ether acetate, propylene glycol monomethyl ether, isopropanol, methanol, acetone, n-butyl acetate, butanone, ethyl acetate, diacetone alcohol, or a combination thereof.

In an embodiment of the invention, based on a usage amount of 100 parts by weight of the resin (A), a usage amount of the crosslinking agent (B) is 60 parts by weight to 74 parts by weight, a usage amount of the surfactant (C) is 1 part by weight to 12 parts by weight, a usage amount of the additive (D) is 1 part by weight to 60 parts by weight, and a usage amount of the solvent (E) is 3100 parts by weight to 5100 parts by weight.

In an embodiment of the invention, based on a usage amount of 100 parts by weight of the resin (A), a usage amount of the additive (D) includes at least one of following usage amount of an additive in the group consisting of: a usage amount of the fluoro-based phenol (D-1) being 22 parts by weight to 40 parts by weight, a usage amount of the polyhydroxyphenol resin (D-2) being 1 part by weight to 27 parts by weight, a usage amount of the compound including an epoxy group (D-3) being 5 parts by weight to 27 parts by weight, a usage amount of the polyether resin (D-4) being 2 parts by weight to 27 parts by weight, a usage amount of the thermal acid generator including a sulfonate ion (D-5) being 5 parts by weight to 60 parts by weight.

A resin composition of the invention includes a resin (A), a crosslinking agent (B), a surfactant (C) and a solvent (E). The resin (A) includes at least one of a phenol-based resin (A-1) and a polystyrene resin including a hydroxyl group (A-2).

A cured film of the invention is formed by curing the resin composition described above.

Based on the above, the resin composition of the invention includes a specific type of the resin (A). Thus, when the resin composition is used to form a cured film, the cured film may have good coating uniformity, chemical resistance and hydrophobicity, and thereby suitable for the process of semiconductor devices, display devices or optical elements. In addition, the resin composition of the invention further includes a specific type of the additive (D). Thus, when the resin composition is used to form a cured film, the cured film may have good coating uniformity, chemical resistance and hydrophobicity, and thereby suitable for the process of semiconductor devices, display devices or optical elements.

DESCRIPTION OF THE EMBODIMENTS

<Resin Composition>

The invention provides a resin composition including a resin (A), a crosslinking agent (B), a surfactant (C) and a solvent (E). In addition, the resin composition of the invention may further include an additive (D). In addition, the resin composition may further include other additives as needed. The components are described hereinafter in detail.

Resin (A)

The resin (A) includes at least one of a phenol-based resin (A-1) and a polystyrene resin including a hydroxyl group (A-2). The resin (A) may be used alone or in combination. In this embodiment, a weight average molecular weight of the resin (A) is 400 to 30,000, preferably 500 to 22,000.

The phenol-based resin (A-1) is not particularly limited, and any suitable phenol-based resin may be selected according to needs. For example, the phenol-based resin (A-1) may be one phenol-based resin or a combination of two or more phenol-based resins. The phenol-based resin (A-1) may include a structural unit composed of polyhydroxyphenol, alkylphenol or polyhydroxyalkylphenol. In this embodiment, a weight average molecular weight of the phenol-based resin (A-1) is 360 to 39,200, preferably 600 to 24,000.

In this embodiment, the phenol-based resin (A-1) may include a structural unit represented by Formula (A1) as follows:

Formula (A1)

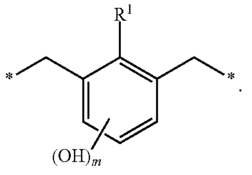

In Formula (A1), $R^1$ represents hydrogen or an alkyl group having 1 to 4 carbon atoms, preferably hydrogen; m represents an integer from 1 to 3, preferably 3; and * represents a bonding position.

In this embodiment, the phenol-based resin (A-1) may include a structure represented by Formula (A1') as follows:

Formula (A1')

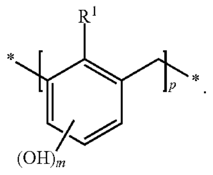

In Formula (A1'), $R^1$ represents hydrogen or an alkyl group having 1 to 4 carbon atoms, preferably hydrogen; m represents an integer from 1 to 3, preferably 3; p represents an integer from 4 to 200, preferably an integer from 6 to 150; and * represents a bonding position.

The polystyrene resin including a hydroxyl group (A-2) is not particularly limited, and any suitable polystyrene resin including a hydroxyl group may be selected according to needs. For example, the polystyrene resin including a hydroxyl group (A-2) may be one polystyrene resin including a hydroxyl group or a combination of two or more polystyrene resin including a hydroxyl group. The polystyrene resin including a hydroxyl group (A-2) may include a structural unit composed of styrene or styrene including a hydroxyl group. In this embodiment, a weight average molecular weight of the polystyrene resin including a hydroxyl group (A-2) is 12,400 to 19,300, preferably 13,000 to 18,000.

In this embodiment, the polystyrene resin including a hydroxyl group (A-2) may include a structural unit represented by Formula (A2) as follows:

Formula (A2)

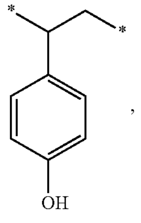

wherein * represents a bonding position.

In this embodiment, the polystyrene resin including a hydroxyl group (A-2) may include a structure represented by Formula (A2') as follows:

Formula (A2')

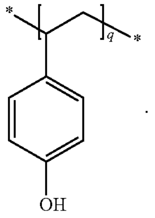

In Formula (A2'), q represents an integer from 103 to 160, preferably an integer from 110 to 154; and * represents a bonding position.

Crosslinking Agent (B)

The crosslinking agent (B) is not particularly limited, and any suitable crosslinking agent may be selected according to needs. For example, the crosslinking agent (B) may include a phenolic epoxy resin-based crosslinking agent, a polymethyl methacrylate-based crosslinking agent, a maleic anhydride-based crosslinking agent or other suitable crosslinking agent. The crosslinking agent (B) may be used alone or in combination. In this embodiment, the crosslinking agent (B) is preferably a polymethyl methacrylate-based crosslinking agent.

Based on a usage amount of 100 parts by weight of the resin (A), a usage amount of the crosslinking agent (B) is 60 parts by weight to 74 parts by weight, preferably 66 parts by weight to 67 parts by weight.

Surfactant (C)

The surfactant (C) is not particularly limited, and any suitable surfactant may be selected according to needs. For example, the surfactant (C) may include a fluorine-based surfactant, a siloxane-based surfactant, an alkali metal alkyl sulfate-based surfactant, an alkyl sulfonate-based surfactant, an alkylaryl sulfonate-based surfactant, a high alkyl naphthalene sulfonate-based surfactant, a polyoxyethylene alkyl ether-based surfactant or other suitable surfactants. The surfactant (C) may be used alone or in combination. In this embodiment, the surfactant (C) is preferably a fluorine-based surfactant. The fluorine-based surfactant may include a hydroxyl group, an ester group, a carboxyl group, an ether group, or a combination thereof, preferably a hydroxyl group, an ether group, or a combination thereof.

Based on a usage amount of 100 parts by weight of the resin (A), a usage amount of the surfactant (C) is 1 part by weight to 12 parts by weight, preferably 3 parts by weight to 5 parts by weight.

Additive (D)

The additive (D) includes a fluoro-based phenol (D-1), a polyhydroxyphenol resin (D-2), a compound including an epoxy group (D-3), a polyether resin (D-4), a thermal acid generator including a sulfonate ion (D-5), or a combination thereof. The additive (D) may further include melamine, polyimide or other suitable additives.

The fluoro-based phenol (D-1) is not particularly limited, and any suitable fluoro-based phenol may be selected according to needs. For example, the fluoro-based phenol (D-1) may include 3,4,5-trifluorophenol, pentafluorophenol or other suitable fluoro-based phenols. The fluoro-based phenol (D-1) may be used alone or in combination. In this embodiment, a weight average molecular weight of the fluoro-based phenol (D-1) is 112 to 600, preferably 120 to 240.

In this embodiment, the fluoro-based phenol (D-1) may include a compound represented by Formula (D1) as follows:

Formula (D1)

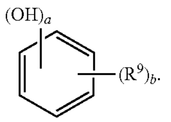

In Formula (D1), $R^9$ represents fluorine or a fluoroalkyl group having less than 4 carbon atoms, preferably a fluorine; a represents an integer greater than 0, preferably an integer from 1 to 2; b represents an integer greater than 0, preferably an integer from 1 to 2; and a sum of a and b is greater than or equal to 2 and less than or equal to 6.

The polyhydroxyphenol resin (D-2) is not particularly limited, and any suitable polyhydroxyphenol resin may be selected according to needs. For example, the polyhydroxyphenol resin (D-2) may include one polyhydroxyphenol resin or a combination of two or more polyhydroxyphenol resins. The polyhydroxyphenol resin (D-2) may include a structural unit composed of polyhydroxyphenol, alkylphenol or polyhydroxyalkylphenol. In this embodiment, a weight average molecular weight of the polyhydroxyphenol resin (D-2) is 12,500 to 30,000, preferably 14,000 to 28,000.

In this embodiment, the polyhydroxyphenol resin (D-2) may include a structural unit represented by Formula (D2) as follows:

Formula (D2)

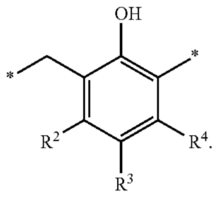

In Formula (D2), $R^2$ to $R^4$ each represent hydrogen or an alkyl group having 1 to 4 carbon atoms, preferably a methyl group; and * represents a bonding position.

In this embodiment, the polyhydroxyphenol resin (D-2) may include a structural unit represented by Formula (D3) as follows and a structural unit represented by Formula (D4) as follows:

Formula (D3)

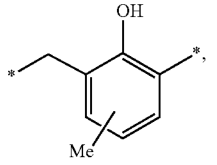

Formula (D4)

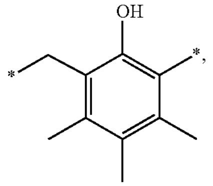

in Formula (D3) and Formula (D4), * represents a bonding position.

A ratio of the structural unit represented by Formula (D3) to the structural unit represented by Formula (D4) is 70:30 to 90:10, preferably 75:25 to 85:15.

The compound including an epoxy group (D-3) is not particularly limited, and any suitable compound including an epoxy group may be selected according to needs. For example, the compound including an epoxy group (D-3) may include epoxycyclohexane, epoxypropane or other suitable compounds including an epoxy group. The compound including an epoxy group (D-3) may be used alone or in combination. In this embodiment, the compound including an epoxy group (D-3) may include an epoxy group, and further includes a long carbon chain, an ether group, or combinations thereof, such as trimethylolpropane triglycidyl ether, neopentyl glycol diglycidyl ether or 1,4-butanediol diglycidyl ether; preferably include an epoxy group and an ether group.

The polyether resin (D-4) is not particularly limited, and any suitable polyether resin may be selected according to needs. For example, the polyether resin (D-4) may be one polyether resin or a combination of two or more polyether resins. The polyether resin (D-4) may include a structural unit including a hydroxyl group, an ether group or a fluorine. In this embodiment, a weight average molecular weight of the polyether resin (D-4) is 2,000 to 10,000, preferably 3,000 to 7,000.

In this embodiment, the polyether resin (D-4) may include a structural unit represented by Formula (D5) as follows:

Formula (D5)

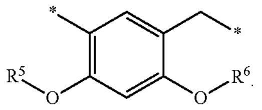

In Formula (D5), $R^5$ and $R^6$ each represent

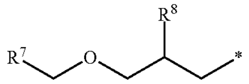

or hydrogen, and at least one of $R^5$ and $R^6$ represent

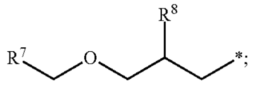

$R^7$ and $R^8$ each represent a hydroxyl group, an ether group, an alkyl group, a fluorine, or a combination thereof, preferably an ether group, a fluorine, or a combination thereof; and * represents a bonding position.

The thermal acid generator including a sulfonate ion (D-5) is not particularly limited, and any suitable thermal acid generator including a sulfonate ion may be selected according to needs. For example, the thermal acid generator including a sulfonate ion (D-5) may include triphenylthio trifluoromethanesulfonate, camphorsulfonic acid or other suitable thermal acid generators including a sulfonate ion. The thermal acid generator including a sulfonate ion (D-5) may be used alone or in combination. In this embodiment, the thermal acid generator including a sulfonate ion (D-5) may include fluorine, such as triphenylthio trifluoromethanesulfonate, perfluorobutanesulfonate or trifluoromethanesulfonate; preferably trifluoromethanesulfonate.

Based on a usage amount of 100 parts by weight of the resin (A), a usage amount of the additive (D) includes at least one of following usage amount of an additive in the group consisting of: a usage amount of the fluoro-based phenol (D-1) being 22 parts by weight to 40 parts by weight, preferably 24 parts by weight to 36 parts by weight; a usage amount of the polyhydroxyphenol resin (D-2) being 1 part by weight to 27 parts by weight, preferably 1 part by weight to 24 parts by weight; a usage amount of the compound including an epoxy group (D-3) being 5 parts by weight to 27 parts by weight, preferably 8 parts by weight to 24 parts by weight; a usage amount of the polyether resin (D-4) being 2 parts by weight to 27 parts by weight, preferably 4 parts by weight to 24 parts by weight; a usage amount of the thermal acid generator including a sulfonate ion (D-5) being 5 parts by weight to 60 parts by weight, preferably 9 parts by weight to 45 parts by weight.

Based on a usage amount of 100 parts by weight of the resin (A), a usage amount of the additive (D) is 1 part by weight to 60 parts by weight, preferably 1 part by weight to 45 parts by weight.

When the resin composition includes the additive (D), the cured film formed by the resin composition is able to have good coating uniformity, chemical resistance and hydrophobicity.

Solvent (E)

The solvent (E) is not particularly limited, and any suitable solvent may be selected according to needs. For example, the solvent (E) may include propylene glycol monomethyl ether acetate (PMA), propylene glycol monomethyl ether (PM), isopropanol, methanol, acetone, n-butyl acetate, butanone, ethyl acetate, diacetone alcohol, cyclopentanone, ethyl lactate or other suitable solvents. The solvent (E) may be used alone or in combination. In this embodiment, the solvent (E) is preferably propylene glycol monomethyl ether acetate, propylene glycol monomethyl ether, or a combination thereof.

Based on a usage amount of 100 parts by weight of the resin (A), a usage amount of the solvent (E) is 3100 parts by weight to 5100 parts by weight, preferably 3480 parts by weight to 4600 parts by weight.

When the resin composition includes the solvent (E), the resin composition is able to have appropriate viscosity, which provides good coating uniformity to form a cured film having good surface flatness.

<Preparation of Resin Composition>

The preparation of the resin composition is not particularly limited. For example, the resin (A), the crosslinking agent (B), the surfactant (C) and the solvent (E) are stirred in a mixer to be mixed uniformly into a solution state, and an additive (D) and/or other additives may also be added if necessary. After mixing them uniformly, a liquid resin composition is obtained.

<Manufacturing Process of Cured Film>

An exemplary embodiment of the invention provides a cured film formed by curing the resin composition.

The cured film may be formed by coating the resin composition above on a substrate to form a coating film and performing baking on the coating film. For example, after the resin composition is coated on the substrate to form a coating film, a baking step is performed at a temperature of 250° C. for 2 minutes to form a cured film with a thickness of 1000 Å on the substrate.

The substrate may be a glass substrate, a plastic base material (for example, a polyether sulfone (PES) board, a polycarbonate (PC) board, or a polyimide (PI) film), or other light-transmitting substrates, and the type thereof is not particularly limited.

The coating method is not particularly limited, but a spray coating method, a roll coating method, a spin coating method, or the like may be used, and in general, a spin coating method is widely used. In addition, a coating film is formed, and then, in some cases, residual solvent may be partially removed under reduced pressure.

The invention is described hereinafter in detail with reference to some examples. The following examples are provided to describe the invention, and the scope of the invention includes the categories described in the following claims, their equivalents, and their modifications. The invention is not limited to the scope of those examples.

Examples of Resin Composition and Cured Film

Example A1 to Example A2, Example B1 to Example B7, Example C1 to Example C2, Example D1 to Example D5, Example E1 to Example E4, Comparative example A1, Comparative example B1, Comparative example C1 to Comparative example C3 and Comparative example E1 of the resin composition and the cured film are described below:

Example A1 a. Resin Composition 100 parts by weight of a resin A-1, 66.80 parts by weight of a monomer forming a structural unit represented by Formula (B1), 4.15 parts by weight of an alkylfluoroether-based surfactant and 31.12 parts by weight of 2-(trifluoromethyl) phenol were added in 3947 parts by weight of propylene glycol monomethyl ether acetate (PMA). After stirring uniformly with a stirrer, the resin composition of Example A1 was obtained.

b. Cured Film

Each resin composition prepared in the examples was coated on a substrate by a spin coating method (spin coater model: MK8, manufactured by Tokyo Electron Limited (TEL), rotation speed: about 1200 to 2000 rpm). Then, baking was performed at a temperature of 250° C. for 2 minutes to obtain the cured films with a pattern thickness of 1000 Å. The obtained cured films were evaluated by each of the following evaluation methods, and the results thereof are as shown in Table 2.

Example A2, Example B1 to Example B7, Example C1 to Example C2, Example D1 to Example D5, Example E1 to Example E4, Comparative Example A1, Comparative Example B1, Comparative Example C1 to Comparative Example C3 and Comparative Example E1

The resin compositions of Example A2, Example B1 to Example B7, Example C1 to Example C2, Example D1 to Example D5, Example E1 to Example E4, Comparative example A1, Comparative example B1, Comparative example C1 to Comparative example C3 and Comparative example E1 were prepared using the same steps as Example A1, and the difference thereof is: the type and the usage amount of the components of the resin compositions were changed (as shown in Tables 2 to 6), wherein the components/compounds corresponding to the symbols in Tables 2 to 6 are shown in Table 1. The obtained resin compositions were made into cured films and evaluated by each of the following evaluation methods, and the results thereof are as shown in Tables 2 to 6.

TABLE 1

| | Symbol | Components/compounds |
|---|---|---|
| Resin (A) | A-1 | Resin A-1, which is a monomer forming a structural unit represented by Formula (A1), in Formula (A1), $R^1$ represents hydrogen, m represents 2. A weight average molecular weight is 400 to 14,000. |
| | A-2 | Resin A-2, which is a monomer forming a structural unit represented by Formula (A1), in Formula (A1), $R^1$ represents hydrogen, m represents 3. A weight average molecular weight is 500 to 27,600. |
| Crosslinking agent (B) | B-1 | Polymer including a structural unit represented by Formula (B1) as follows: 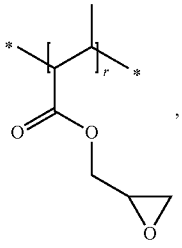 , Formula (B1) wherein r represents an integer from 53 to 138. |
| Surfactant (C) | C-1 | Surfactant represented by Formula (C1) as follows, 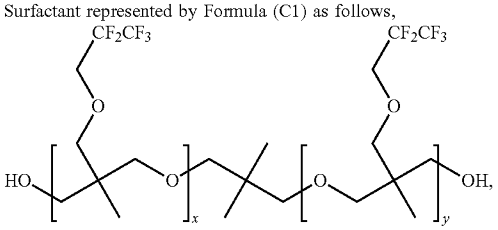 Formula (C1) wherein a sum of x and y is about 20. |
| Additive (D) | D-1 | 2-(Trifluoromethyl) phenol |
| | D-2 | Resin including the structural unit represented by Formula (D3) and the structural unit represented by Formula (D4), wherein the ratio of the structural unit represented by Formula (D3) to the structural unit represented by Formula (D4) is 85:15. A weight average molecular weight is 14,000 to 28,000. |
| | D-3 | 1,6-Hexanediol diglycidyl ether |
| | D-4 | Resin including a structural unit represented by Formula (D6), a structural unit represented by Formula (D7) and a structural unit represented by Formula (D8): 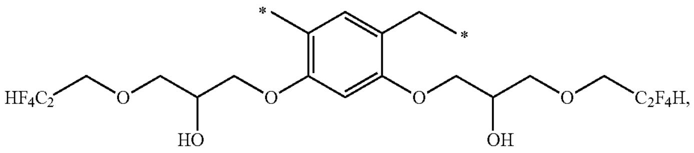 Formula (D6) 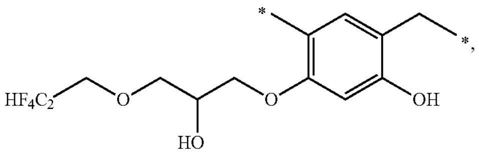 Formula (D7) |

TABLE 1-continued

| | Symbol | Components/compounds |
|---|---|---|
| | | 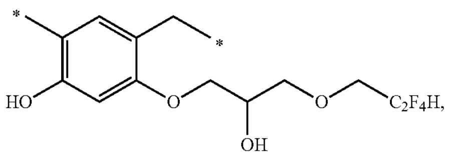<br>Formula (D8)<br>in Formula (D6) to Formula (D8), * represents a bonding position. A ratio of the structural unit represented by Formula (D6), the structural unit represented by Formula (D7) and the structural unit represented by Formula (D8) is 1:2:2. A weight average molecular weight is 3,000 to 7,000. |
| | D-5 | Fluorine-based compound including a sulfonate ion (trade name: K-PURE TAG series, manufactured by Kelly Chemical Corporation). |
| Solvent (E) | E-1 | Propylene glycol monomethyl ether acetate (PMA) |
| | E-2 | Mixed solvent with a weight ratio of propylene glycol monomethyl ether acetate and propylene glycol monomethyl ether (PMA:PM) of 3:7 |
| | E-3 | Mixed solvent with a weight ratio of propylene glycol monomethyl ether acetate and propylene glycol monomethyl ether of 4:6 |

TABLE 2

| Component | | Example | | Comparative example |
|---|---|---|---|---|
| (unit: parts by weight) | | A1 | A2 | A1 |
| Resin (A) | A-1 | 100 | 100 | 100 |
| | A-2 | — | — | — |
| Crosslinking agent (B) | B-1 | 66.80 | 66.80 | 66.80 |
| Surfactant (C) | C-1 | 4.15 | 4.15 | 4.15 |
| Additive (D) | D-1 | 31.12 | — | 17.01 |
| | D-2 | — | — | — |
| | D-3 | — | — | — |
| | D-4 | — | — | — |
| | D-5 | — | — | — |
| Solvent (E) | E-1 | 3947 | 3978 | 3961 |
| | E-2 | — | — | — |
| | E-3 | — | — | — |

TABLE 2-continued

| Component | | Example | | Comparative example |
|---|---|---|---|---|
| (unit: parts by weight) | | A1 | A2 | A1 |
| Evaluation results | Flatness (Å) | 14 | 28 | 28 |
| | Loss of film thickness (Å) | 1.0 | 5.5 | 5.8 |
| | Contact angle before chemical resistance test (°) | 70.8 | 78.5 | 70.9 |
| | Contact angle after chemical resistance test (°) | 73.4 | 78.0 | 75.4 |
| | Contact angle difference (°) | 2.6 | −0.5 | 4.5 |

TABLE 3

| Component | | Example | | | | | | | Comparative example |
|---|---|---|---|---|---|---|---|---|---|
| (unit: parts by weight) | | B1 | B2 | B3 | B4 | B5 | B6 | B7 | B1 |
| Resin (A) | A-1 | — | — | — | — | — | — | — | — |
| | A-2 | 100 | 100 | 100 | 100 | 100 | 100 | 100 | 100 |
| Crosslinking agent (B) | B-1 | 66.67 | 66.67 | 66.67 | 66.67 | 66.67 | 66.67 | 66.67 | 66.67 |
| Surfactant (C) | C-1 | 4.76 | 4.76 | 4.76 | 4.76 | 4.76 | 4.76 | 4.76 | 4.76 |
| Additive (D) | D-1 | — | — | — | — | — | — | — | — |
| | D-2 | — | 1.43 | 2.38 | 3.33 | 4.76 | 14.29 | 23.81 | 0.48 |
| | D-3 | — | — | — | — | — | — | — | — |
| | D-4 | — | — | — | — | — | — | — | — |
| | D-5 | — | — | — | — | — | — | — | — |
| Solvent (E) | E-1 | — | — | — | — | — | — | — | — |
| | E-2 | 4590 | 4589 | 4588 | 4587 | 4586 | 4576 | 4567 | 4590 |
| | E-3 | — | — | — | — | — | — | — | — |
| Evaluation results | Flatness (Å) | 24 | 9 | 13 | 14 | 12 | 17 | 15 | 11 |
| | Loss of film thickness (Å) | 7.9 | 9.1 | 11.6 | 10.6 | 2.3 | 0.6 | 8.7 | 14.6 |
| | Contact angle before chemical resistance test (°) | 69.4 | 73.3 | 73.8 | 76.7 | 80.7 | 81.9 | 82.6 | 68.0 |

TABLE 3-continued

| Component (unit: parts by weight) | | Example B1 | B2 | B3 | B4 | B5 | B6 | B7 | Comparative example B1 |
|---|---|---|---|---|---|---|---|---|---|
| | Contact angle after chemical resistance test (°) | 71.5 | 74.7 | 74.8 | 76.8 | 80.5 | 81.3 | 82.0 | 72.5 |
| | Contact angle difference (°) | 2.1 | 1.4 | 1.0 | 0.1 | −0.2 | −0.6 | −0.6 | 4.5 |

TABLE 4

| Component (unit: parts by weight) | | Example C1 | Example C2 | Comparative example C1 | Comparative example C2 | Comparative example C3 |
|---|---|---|---|---|---|---|
| Resin (A) | A-1 | — | — | — | — | — |
| | A-2 | 100 | 100 | 100 | 100 | 100 |
| Crosslinking agent (B) | B-1 | 66.67 | 66.67 | 66.67 | 66.67 | 66.67 |
| Surfactant (C) | C-1 | 4.76 | 4.76 | 4.76 | 4.76 | 4.76 |
| Additive (D) | D-1 | — | — | — | — | — |
| | D-2 | — | — | — | — | — |
| | D-3 | — | 19.05 | 28.57 | 42.86 | 57.14 |
| | D-4 | — | — | — | — | — |
| | D-5 | — | — | — | — | — |
| Solvent (E) | E-1 | — | — | — | — | — |
| | E-2 | 4590 | 4571 | 4562 | 4548 | 4533 |
| | E-3 | — | — | — | — | — |
| Evaluation results | Flatness (Å) | 24 | 20 | 18 | 19 | 30 |
| | Loss of film thickness (Å) | 7.9 | 7.3 | 7.1 | 6.2 | 5.7 |
| | Contact angle before chemical resistance test (°) | 69.4 | 67.6 | 67.3 | 67.2 | 67.7 |
| | Contact angle after chemical resistance test (°) | 71.5 | 70.5 | 71.4 | 72.3 | 70.9 |
| | Contact angle difference (°) | 2.1 | 2.9 | 4.1 | 5.1 | 3.2 |

TABLE 5

| Component (unit: parts by weight) | | Example D1 | D2 | D3 | D4 | D5 |
|---|---|---|---|---|---|---|
| Resin (A) | A-1 | — | — | — | — | — |
| | A-2 | 100 | 100 | 100 | 100 | 100 |
| Crosslinking agent (B) | B-1 | 66.67 | 66.67 | 66.67 | 66.67 | 66.67 |
| Surfactant (C) | C-1 | 4.76 | 4.76 | 4.76 | 4.76 | 4.76 |
| Additive (D) | D-1 | — | — | — | — | — |
| | D-2 | — | — | — | — | — |
| | D-3 | — | — | — | — | — |
| | D-4 | — | 4.76 | 9.52 | 14.29 | 23.81 |
| | D-5 | — | — | — | — | — |
| Solvent (E) | E-1 | — | — | — | — | — |
| | E-2 | 4590 | — | — | — | — |
| | E-3 | — | 4586 | 4581 | 4576 | 4567 |
| Evaluation results | Flatness (Å) | 24 | 11 | 10 | 12 | 11 |
| | Loss of film thickness (Å) | 7.9 | 10.4 | 9.7 | 10 | 12.8 |
| | Contact angle before chemical resistance test (°) | 69.4 | 76.8 | 81.1 | 85.4 | 86.9 |
| | Contact angle after chemical resistance test (°) | 71.5 | 77.3 | 81.4 | 85.6 | 86.8 |
| | Contact angle difference (°) | 2.1 | 0.5 | 0.3 | 0.2 | −0.1 |

TABLE 6

| Component (unit: parts by weight) | | Example E1 | E2 | E3 | E4 | Comparative example E1 |
|---|---|---|---|---|---|---|
| Resin (A) | A-1 | — | — | — | — | — |
| | A-2 | 100 | 100 | 100 | 100 | 100 |
| Crosslinking agent (B) | B-1 | 66.67 | 66.67 | 66.67 | 66.67 | 66.67 |
| Surfactant (C) | C-1 | 4.76 | 4.76 | 3.70 | 3.70 | 4.76 |
| Additive (D) | D-1 | — | — | — | — | — |
| | D-2 | — | — | — | — | — |
| | D-3 | — | — | — | — | — |
| | D-4 | — | — | — | — | — |
| | D-5 | — | 9.52 | 14.81 | 44.44 | 4.76 |
| Solvent (E) | E-1 | 4590 | 4581 | 3519 | 3489 | 4586 |
| | E-2 | — | — | — | — | — |
| | E-3 | — | — | — | — | — |
| Evaluation results | Flatness (Å) | 24 | 22 | 17 | 39 | 29 |
| | Loss of film thickness (Å) | 7.9 | −0.5 | 5.7 | 0.7 | 5.2 |
| | Contact angle before chemical resistance test (°) | 69.4 | 81 | 82.5 | 82.4 | 78.5 |

TABLE 6-continued

| Component | Example | | | | Comparative example |
|---|---|---|---|---|---|
| (unit: parts by weight) | E1 | E2 | E3 | E4 | E1 |
| Contact angle after chemical resistance test (°) | 71.5 | 83.7 | 84.2 | 84.7 | 82.8 |
| Contact angle difference (°) | 2.1 | 2.7 | 1.7 | 2.3 | 4.3 |

<Evaluation Methods> a. Flatness

The prepared cured film was measured via a Ellipsometer (Model: M-2000, manufactured by J. A. Woollam Co. Inc.) to obtain the Cauchy parameters. Then, the measured parameters were brought into the Optical film thickness (Model: DNS VM-1210, manufactured by SCREEN semiconductor solutions Co., Ltd.) to detect the film thicknesses at 69 different places on the film surface to obtain the average film thickness and the uniformity to evaluate the flatness. When the average film thickness is smaller and the uniformity is good, the cured film has good flatness.

b. Loss of Film Thickness

The prepared cured film was soaked in a mixed solvent with a weight ratio of propylene glycol monomethyl ether and propylene glycol monomethyl ether acetate (PM:PMA) of 7:3 (abbreviated as solvent OK73) for 10 minutes, and the film thickness after soaking was measured. The film thickness before soaking was subtracted from the film thickness measured after soaking to obtain the first value of loss of film thickness.

Next, it was further soaked in a mixed solvent with a weight ratio of $H_2O$, $H_2O_2$ and $NH_4OH$ ($H_2O$:$H_2O_2$:$NH_4OH$) of 5:1:1 (abbreviated as solvent SC1) for 10 minutes, and then baked at a temperature of 120° C. for 1 minute to measure the film thickness after baking. The film thickness before soaking was subtracted from the film thickness measured after baking to obtain the loss of film thickness. When the loss of film thickness is smaller, the cured film has good chemical resistance.

c. Contact Angle Before Chemical Resistance Test

10 μL of deionized water was dropped on the surface of the prepared cured film. Next, the contact angle between the deionized water and the surface of the prepared cured film was measured via an contact angle meter (Model: DropMaster500, manufactured by Kyowa Interface Science Co., Ltd.) to obtain a contact angle before chemical resistance test.

d. Contact Angle after Chemical Resistance Test

The prepared cured film was soaked in solvent OK73 for 10 minutes and solvent SC1 for 10 minutes in sequence, and then baked at a temperature of 120° C. for 1 minute to obtain a film after chemical resistance test. 10 μL of deionized water was dropped on the surface of the film after chemical resistance test. Next, the contact angle between the deionized water and the surface of the film after chemical resistance test was measured via an contact angle meter (Model: DropMaster500, manufactured by Kyowa Interface Science Co., Ltd.) to obtain a contact angle after chemical resistance test.

e. Contact Angle Difference

The difference obtained by subtracting the contact angle before chemical resistance test from the measured contact angle after chemical resistance test is the contact angle difference. When the contact angle difference is smaller, the cured film has good hydrophobicity.

<Evaluation Results>

In Tables 2 to 6, the cured films with flatness (film thickness) less than 40 Å, loss of film thickness less than 15 Å, and contact angle difference less than or equal to 3 degrees were listed as Examples. On the contrary, the cured films whose measured flatness (film thickness), loss of film thickness, and contact angle difference were not within the aforementioned conditions were listed as Comparative examples. It is noticed that the measured flatness (film thickness), loss of film thickness and contact angle difference of the resin composition and the cured film formed therefrom listed as a Comparative example are within the range of acceptable use in the technical field to which the invention belongs.

It may be seen from Tables 2 to 6 that the cured films formed by the Examples with the resin composition including specific type of the additive (D) have good coating uniformity, chemical resistance and hydrophobicity, and may be suitable for the process of semiconductor devices, display devices or optical elements.

It may be seen from Table 2 that compared to the cured film (Example A2) formed by the resin composition in which the additive (D) does not include the fluoro-based phenol (D-1), the cured films (Example A1) prepared by the resin composition in which the additive (D) includes the fluoro-based phenol (D-1) have better coating uniformity and chemical resistance.

Compared to the cured film (Comparative example A1) formed by the resin composition in which the additive (D) includes the fluoro-based phenol (D-1) in the usage amount of less than 22 parts by weight, the cured films (Example A1) prepared by the resin composition in which the additive (D) includes the fluoro-based phenol (D-1) in the usage amount of 22 parts by weight to 40 parts by weight have better coating uniformity, chemical resistance and hydrophobicity.

It may be seen from Table 3 that compared to the cured film (Example B1) formed by the resin composition in which the additive (D) does not include the polyhydroxyphenol resin (D-2), the cured films (Examples B2 to B7 and Comparative example B1) prepared by the resin composition in which the additive (D) includes the polyhydroxyphenol resin (D-2) have better coating uniformity and good chemical resistance.

Compared to the cured film (Comparative example B1) formed by the resin composition in which the additive (D) includes the polyhydroxyphenol resin (D-2) in the usage amount of less than 1 part by weight, the cured films (Examples B2 to B7) prepared by the resin composition in which the additive (D) includes the polyhydroxyphenol resin (D-2) in the usage amount of 1 part by weight to 27 parts by weight have better chemical resistance and hydrophobicity, and have good coating uniformity at the same time.

It may be seen from Table 4 that compared to the cured film (Example C1) formed by the resin composition in which the additive (D) does not include the compound including an epoxy group (D-3), the cured films (Example C2 and Comparative examples C1 to C3) prepared by the resin composition in which the additive (D) includes the compound including an epoxy group (D-3) have better chemical resistance and good coating uniformity.

Compared to the cured film (Comparative examples C1 to C3) formed by the resin composition in which the additive (D) includes the compound including an epoxy group (D-3) in the usage amount of less than 5 parts by weight or greater than 27 parts by weight, the cured films (Example C2) prepared by the resin composition in which the additive (D) includes the compound including an epoxy group (D-3) in the usage amount of 5 parts by weight to 27 parts by weight have better hydrophobicity, and have good coating uniformity and chemical resistance at the same time.

It may be seen from Table 5 that compared to the cured film (Example D1) formed by the resin composition in which the additive (D) does not include the polyether resin (D-4), the cured films (Examples D2 to D5) prepared by the resin composition in which the additive (D) includes the polyether resin (D-4) have better coating uniformity and hydrophobicity, and have good chemical resistance at the same time.

Compared to the cured film (Example D1) formed by the resin composition in which the additive (D) includes the polyether resin (D-4) in the usage amount of less than 2 parts by weight or greater than 27 parts by weight, the cured films (Examples D2 to D5) prepared by the resin composition in which the additive (D) includes the polyether resin (D-4) in the usage amount of 2 parts by weight to 27 parts by weight have better coating uniformity and hydrophobicity, and have good chemical resistance at the same time.

It may be seen from Table 6 that compared to the cured film (Example E1) formed by the resin composition in which the additive (D) does not include the thermal acid generator including a sulfonate ion (D-5), the cured films (Examples E2 to E4 and Comparative example E1) prepared by the resin composition in which the additive (D) includes the thermal acid generator including a sulfonate ion (D-5) have better coating uniformity and hydrophobicity.

Compared to the cured film (Comparative example E1) formed by the resin composition in which the additive (D) includes the thermal acid generator including a sulfonate ion (D-5) in the usage amount of less than 5 parts by weight or greater than 60 parts by weight, the cured films (Examples E2 to E4) prepared by the resin composition in which the additive (D) includes the thermal acid generator including a sulfonate ion (D-5) in the usage amount of 5 parts by weight to 60 parts by weight have better chemical resistance and hydrophobicity, and have good coating uniformity at the same time.

Based on the above, when the resin composition of the invention includes the specific type of the resin (A), the cured film formed by the resin composition has good coating uniformity, chemical resistance and hydrophobicity, thereby suitable for the process of semiconductor devices, display devices or optical elements. In addition, when the resin composition of the invention further includes the additive (D), and the additive (D) includes the fluoro-based phenol (D-1), the polyhydroxyphenol resin (D-2), the compound including an epoxy group (D-3), the polyether resin (D-4), the thermal acid generator including a sulfonate ion (D-5), or a combination thereof, the cured film formed by the resin composition has better coating uniformity, chemical resistance and/or hydrophobicity, thereby suitable for the process of semiconductor devices, display devices or optical elements.

Although the invention has been disclosed in the embodiments above, they are not intended to limit the invention. Anyone with ordinary knowledge in the relevant technical field can make changes and modifications without departing from the spirit and scope of the invention. The scope of protection of the invention shall be subject to those defined by the claims attached.

What is claimed is:

1. A resin composition, comprising:

a resin (A) comprising at least one of a phenol-based resin (A-1) and a polystyrene resin comprising a hydroxyl group (A-2);

a crosslinking agent (B);

a surfactant (C);

an additive (D), wherein the additive (D) comprises a fluoro-based phenol (D-1), a polyhydroxyphenol resin (D-2), a compound comprising an epoxy group (D-3), a polyether resin (D-4), a thermal acid generator comprising a sulfonate ion (D-5), or a combination thereof; and a solvent (E), wherein, based on a usage amount of 100 parts by weight of the resin (A), a usage amount of the crosslinking agent (B) is 60 parts by weight to 74 parts by weight, a usage amount of the surfactant (C) is 1 part by weight to 12 parts by weight, a usage amount of the additive (D) is 1 part by weight to 60 parts by weight, and a usage amount of the solvent (E) is 3100 parts by weight to 5100 parts by weight.

2. The resin composition according to claim 1, wherein a weight average molecular weight of the resin (A) is 400 to 30,000.

3. The resin composition according to claim 1, wherein the phenol-based resin (A-1) comprises a structural unit represented by Formula (A1) as follows:

Formula (A1)

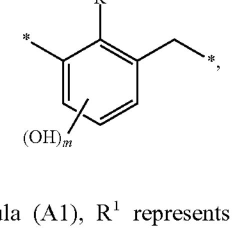

in Formula (A1), $R^1$ represents hydrogen or an alkyl group having 1 to 4 carbon atoms, m represents an integer from 1 to 3, and * represents a bonding position;

a weight average molecular weight of the phenol-based resin (A-1) is 360 to 39,200.

4. The resin composition according to claim 1, wherein the polystyrene resin comprising a hydroxyl group (A-2) comprises a structural unit represented by Formula (A2) as follows:

Formula (A2)

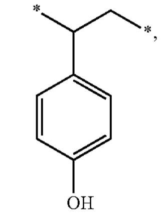

wherein * represents a bonding position;

a weight average molecular weight of the polystyrene resin comprising a hydroxyl group (A-2) is 12,400 to 19,300.

5. The resin composition according to claim 1, wherein the crosslinking agent (B) comprises a phenolic epoxy resin-based crosslinking agent, a polymethyl methacrylate-based crosslinking agent, a maleic anhydride-based cross-linking agent, or a combination thereof.

6. The resin composition according to claim 1, wherein surfactant (C) comprises a fluorine-based surfactant, the fluorine-based surfactant comprises a hydroxyl group, an ester group, a carboxyl group, an ether group, or a combination thereof.

7. The resin composition according to claim 1, wherein the fluoro-based phenol (D-1) comprises a compound represented by Formula (D1) as follows:

Formula (D1)

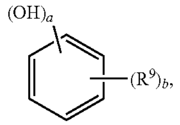

in Formula (D1), $R^9$ represents fluorine or a fluoroalkyl group having less than 4 carbon atoms, a represents an integer greater than 0, b represents an integer greater than 0, and a sum of a and b is greater than or equal to 2 and less than or equal to 6;

a weight average molecular weight of the fluoro-based phenol (D-1) is 112 to 600.

8. The resin composition according to claim 1, wherein the polyhydroxyphenol resin (D-2) comprises a structural unit represented by Formula (D2) as follows:

Formula (D2)

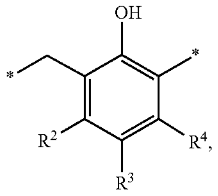

in Formula (D2), $R^2$ to $R^4$ each represent hydrogen or an alkyl group having 1 to 4 carbon atoms, and * represents a bonding position;

a weight average molecular weight of the polyhydroxyphenol resin (D-2) is 12,500 to 30,000.

9. The resin composition according to claim 1, wherein the polyhydroxyphenol resin (D-2) comprises a structural unit represented by Formula (D3) as follows and a structural unit represented by Formula (D4) as follows:

Formula (D3)

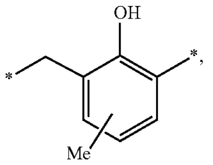

Formula (D4)

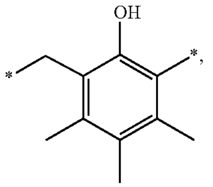

in Formula (D3) and Formula (D4), * represents a bonding position; wherein a ratio of the structural unit represented by Formula (D3) to the structural unit represented by Formula (D4) is 70:30 to 90:10.

10. The resin composition according to claim 1, the compound comprising an epoxy group (D-3) comprises an epoxy group and an ether group.

11. The resin composition according to claim 1, wherein the polyether resin (D-4) comprises a structural unit represented by Formula (D5) as follows:

Formula (D5)

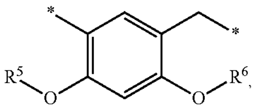

in Formula (D5), $R^5$ and $R^6$ each represent

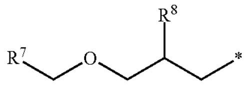

or hydrogen, and at least one of $R^5$ and $R^6$ represent

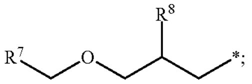

$R^7$ and $R^8$ each represent a hydroxyl group, an ether group, an alkyl group, a fluorine, or a combination thereof, and represents a bonding position;

a weight average molecular weight of the polyether resin (D-4) is 2,000 to 10,000.

12. The resin composition according to claim 1, wherein the thermal acid generator comprising a sulfonate ion (D-5) comprises fluorine.

13. The resin composition according to claim 1, wherein the solvent (E) comprises propylene glycol monomethyl ether acetate, propylene glycol monomethyl ether, isopropanol, methanol, acetone, n-butyl acetate, butanone, ethyl acetate, diacetone alcohol, or a combination thereof.

14. The resin composition according to claim 1, wherein, based on a usage amount of 100 parts by weight of the resin (A), a usage amount of the additive (D) comprises at least one of following usage amount of an additive in the group consisting of: a usage amount of the fluoro-based phenol (D-1) being 22 parts by weight to 40 parts by weight, a usage amount of the polyhydroxyphenol resin (D-2) being 1 part by weight to 27 parts by weight, a usage amount of the compound comprising an epoxy group (D-3) being 5 parts by weight to 27 parts by weight, a usage amount of the polyether resin (D-4) being 2 parts by weight to 27 parts by weight, a usage amount of the thermal acid generator comprising a sulfonate ion (D-5) being 5 parts by weight to 60 parts by weight.

15. A cured film formed by curing the resin composition according to claim 1.

* * * * *